United States Patent Office 3,422,001
Patented Jan. 14, 1969

3,422,001
PROCESS FOR THE HYDROGENATION OF
UNSATURATED HYDROCARBONS
Herman W. Kouwenhoven, Pieter C. Aben, and Karel van der Wal, Amsterdam, Netherlands, assignors to Shell Oil Company, New York, N.Y., a corporation of Delaware
No Drawing. Filed Feb. 3, 1966, Ser. No. 524,856
Claims priority, application Netherlands, Feb. 8, 1965, 6501529
U.S. Cl. 208—143   3 Claims
Int. Cl. C10g 23/02; B01j 11/74; B01j 11/78

ABSTRACT OF THE DISCLOSURE

A process for hydrogenation of unsaturated hydrocarbons with a sulfided hydrogenation catalyst prepared by contacting a calcined supported hydrogenation metal component catalyst with a gas providing HCl during or subsequent to sulfiding.

---

This invention relates to the hydrogenation of unsaturated hydrocarbons by means of sulfide catalysts.

The hydrogenation of unsaturated hydrocarbons and hydrocarbon mixtures by bringing them, together with hydrogen, into contact with sulfide catalysts is a well known art. The hydrogenation of aromatics by means of these catalysts is applied to products of the petroleum and tar industries for several purposes. For example, it is used for the preparation of cyclohexane from crude benzene, for the improvement of the smoke point of kerosenes, for an increase in specific combustion heat of fuels for jet engines, as well as for the improvement of lubricating oil properties.

Several sulfide catalysts have already been proposed for hydrogenating unsaturated hydrocarbons. However, most of these catalysts have practical drawbacks of either a technological or an economic nature. In certain cases their activity and/or lifetime is insufficient, while active catalysts usually fail with respect to selectivity, i.e., in addition to the hydrogenation, a relatively large part of the hydrocarbon material is cracked, which not only proceeds at the expense of the yield of desired product, but also leads to increased consumption of hydrogen.

It has now been found that in the hydrogenation of unsaturated hydrocarbons, a considerably increased production of hydrogenated hydrocarbons can be obtained, without an increase in undesirable side reactions, by using a specially treated catalyst composition comprising one or more metal sulfide components supported on a carrier which entirely or substantially consists of alumina. This treatment consists of contacting the catalyst during and/or after the sulfidation with hydrogen chloride or with a compound which can form hydrogen chloride under the conditions of the treatment. The metal sulfide component comprises a combination of one or more sulfides of the metals tungsten, molybdenum and rhenium and of one or more sulfides of the metals of Group VIII of the Periodic System of elements.

Catalysts have been subjected to a treatment with halogens before. The purpose was to promote the acidic character of the catalyst, for example, to reach higher yields in cracking reactions. Instead of halogens, halogen acids, such as hydrofluoric acid have also been used.

Such treatments to enhance the cracking activity have also been applied to catalysts supported on carriers, the treatment being carried out before, during or after the impregnation of the carrier material, i.e., before the usual calcination.

It is essential to the present process that the treatment with hydrogen chloride be conducted after the calcination, viz during and/or after conversion of the metal component, or components, into sulfide or sulfides.

As stated above, the hydrogenating activity of the present catalyst is increased selectively by the hydrogen chloride treatment, i.e., under the usual hydrogenating conditions, undesirable side reactions, such as cracking, do not occur to a higher degree.

The hydrogen chloride treatment especially applies to alumina, i.e., the selective increase in hydrogenating activity does not, or practically not occur if the treatment is applied to catalysts containing other carrier materials, such as the usual silica-alumina compounds.

According to the invention, alumina can be either aluminum oxide prepared by conventional synthesis, for example, via precipitation from an aluminum salt, or aluminum oxide from natural sources. It is essential that no substances are present which would raise the acidity to a considerable extent. For example, the alumina should contain not more than 5% w. and preferably not more than 2% w. of silica in acidic form. The presence of silica in non-acidic form, i.e., neutralized, for instance, by caustic soda, may however, be desirable in many cases, since it imparts to the carrier material an increased resistance to wear.

As mentioned above, it is essential that the hydrogen chloride treatment of the catalyst is carried out during the sulfiding step and/or applied when the hydrogenation metal component is already present in sulfide form. If the hydrogen chloride treatment is performed in a stage of the catalyst preparation when the metals are not yet present as the sulfide, for example, before, during or after the impregnation of the carrier material with an aqueous metal salt solution, or during or after the calcination, little or no effect of the hydrogen chloride treatment on the hydrogenating activity of the catalyst is obtained.

The hydrogen chloride treatment according to the invention may be effected by passing a gaseous mixture of hydrogen, hydrogen sulfide, hydrogen chloride and/or a hydrogen chloride-forming compound over the non-sulfided or partly sulfided catalyst. The treatment with hydrogen chloride and/or a hydrogen chloride-forming compound may also be applied to a catalyst which is already in sulfide form; in this treatment hydrogen sulfide may also be present in the gas, if desired.

The hydrogen chloride treatment may be carried out at room temperature. However, a considerably higher hydrogenating activity is obtained if temperatures above 200° C., in particular between 350 and 450° C. are used. As a rule the treatment is continued until the catalyst contains from 0.4 to 6% w. and preferably from 0.6 to 2% w. of chlorine (basis the carrier).

Instead of hydrogen chloride per se, a gas providing hydrogen chloride can be used. For example, a suitable hydrogen chloride-forming compound such as an organic chloride can be used. In the presence of hydrogen and under the conditions of the treatment, the organic chloride forms hydrogen chloride. Very suitable are chlorides which contain an alkyl radical with 1–5 carbon atoms.

The total quantity of hydrogenative metal employed in the catalyst usually amounts to from 10 to 30% w. and preferably to from 15 to 25% w., basis the total catalyst. The atomic ratio of the metal or of the metals tungsten, molybdenum and rhenium, to the metal or metals of Group VIII of the Periodic System of elements is as a rule chosen between 10 and 0.5 and preferably between 3 and 2.

Suitable starting materials are in general unsaturated compounds such as aromatics containing hydrocarbon oil fractions or other unsaturated hydrocarbon fractions originating from the petroleum and coal tar industries. Examples are crude benzene and petroleum fractions, for example, with boiling ranges in the gasoline, kerosene, gas oil and lubricating oil ranges. The hydrogenation of kerosene fractions leads to products with an increased smoke point, while the decrease in aromatics content of hydrocarbon oil fractions in the gas oil range yields products with an increased cetane number, which are suitable, for instance, as a fuel for diesel engines. The hydrogenation of unsaturated hydrocarbons such as olefins is also to be considered within the scope of the invention.

The hydrogenation according to the present invention may take place in the vapor phase, liquid phase or partly in the vapor and partly in the liquid phase. In view of the relatively low hydrogenating temperatures which can be used, it is possible to keep the hydrocarbons entirely or substantially in the liquid phase, without this leading to particularly high working pressures. A very suitable embodiment of the process, in which the hydrocarbons are passed over the catalyst entirely or partly in the liquid phase, is the so-called trickle technique, which has been described, for example, in British Patent 657,521. The process is preferably carried out continuously. The catalysts can be used in a fluidized or dispersed state; however, preference is given to a fixed-bed catalyst.

The hydrogenation is carried out at pressures, temperatures and space velocities which may vary within wide limits. Temperature is in the range of from 150 to 400° C. and preferably from 200 to 350° C. The choice of temperature to be used in a given case is largely governed by the catalyst used. As a rule, hydrogen partial pressures of from 25 to 150 atm. abs. and preferably of from 40 to 120 atm. abs. are applied. The hydrogen pressure is mainly chosen in regard to what reaction temperature is used. Liquid hourly space velocity is in the range from about 0.4 to 10 and preferably to from about 1 to 6 volumes of oil per volume of catalyst per hour. The hydrogen rate is usually in the range from about 150 to 10,000 standard cubic feet per barrel of oil.

As the present catalysts also have a desulfurizing effect, hydrocarbon products can usually be obtained which meet very stringent quality requirements with respect to, for instance, sulfur content, smoke point, cetane number and the like. If only a relatively small improvement in smoke point or cetane number is desired, it is not necessary to subject the entire feed to the reaction, but to subject only part of the feed to complete or partial hydrogenation and subsequently mix this part with the non-hydrogenated part.

In the process according to the invention, the sulfide catalysts show a tendency to become deactivated after some time, especially if they are applied to the hydrogenation of feeds with a very low sulfur content, for example, less than 10 p.p.m. w. This decline in activity is attributed to some degree of desulfurization of the sulfide catalyst. The original hydrogenating activity of the catalyst can be entirely or substantially restored in a simple way by resulfiding the catalyst. This can be done, for instance, by passing over the catalyst a mixture of hydrogen and hydrogen sulfide and/or a hydrocarbon or a hydrocarbon mixture having a sulfur content higher than that of the feed. During resulfiding, hydrogen chloride and/or a hydrogen chloride-forming compound can also be added to the sulfiding mixture.

The present catalysts can be prepared as follows. Alumina or alumina-containing carrier material having less than about 5% w. of acidic silica (if desired, after milling to the desired particle size), is impregnated with an aqueous solution of one or more salts of the metals molybdenum, tungsten, rhenium and one or more salts of metals of Group VIII of the Periodic System of elements. Subsequently, the impregnated material is dried in the usual way and calcined, for example, at from 400 to 500° C., in order to convert the metal salts into the corresponding oxides. Next, the oxides are wholly or partly converted into sulfides. Sulfiding can be effected both in the gaseous and in the liquid phase. In general, it is carried out by passing over the catalyst a mixture of hydrogen and hydrogen sulfide, carbon disulfide and/or a mercaptan, such as butyl mercaptan, at an elevated temperature, for instance, from 350 to 450° C. Instead of these sulfur compounds, a sulfur-containing hydrocarbon oil, for example, a gasoline, kerosene or gas oil, can very well be used as a sulfiding agent. The sulfur content of the sulfied catalyst is generally from 70 to 100% of the theoretical quantity to convert all the metal to the sulfide form. During and/or after the sulfiding, the hydrochloric acid treatment is carried out by contacting the catalyst with a gaseous mixture containing hydrogen chloride acid and/or a hydrogen chloride-forming compound and, in addition, a diluent, such as hydrogen. This acid treatment is, as a rule, carried out at temperatures above 200° C., in particular at from 350 to 450° C.

The hydrogen to be used in the hydrogenation does not need to be pure hydrogen but can be a hydrogen-containing gas, for example, a mixture of hydrogen and light hydrocarbons. The hydrogen-containing gases should preferably contain more than 50% w. of hydrogen. Very suitable are, for example, hydrogen-containing gases obtained in catalytic reforming of gasoline fractions. When hydrogen is used in excess, it is advantageous to recirculate the hydrogen, if necessary, after having removed undesired compounds.

To ensure satisfactory hydrogenation, the amount of hydrogen used is at least equal to the quantity theoretically required to obtain saturated conversion products. In general, to promote longer catalyst life, a considerably larger amount of hydrogen is used.

The following examples serve to illustrate the invention and its advantages.

EXAMPLE I

In order to carry out comparative hydrogenation experiments, five nickel-tungsten-alumina catalysts were prepared.

Catalyst A

Commercial gamma-alumina with an average particle size of 0.3 mm. was impregnated with a metal salt solution obtained by dissolving, on a weight basis, 6 parts of ammonium tungstate in 100 parts of water containing 1.5 parts of monoethanolamine, with heating, and by subsequent adding to this solution a solution of 4.6 parts of nickel nitrate in 31 parts of water. The impregnated alumina particles were dried at 120° C., next calcined for the three hours at 500° C. and finally sulfided with a mixture of hydrogen sulfide and hydrogen (volume ratio 1:7) at 450° C. and 10 atm. gauge.

The finished catalyst contained 16.9 parts of tungsten and 2 parts of nickel on 100 parts of alumina. Hydrogenating activity was determined by passing a mixture of hydrogen and benzene over the catalyst in a tubular reactor. The conditions employed were: temperature 400° C., hydrogen pressure 48 atm. abs., molar ratio hydrogen benzene of 35:1, and a space velocity of 1 volume of benzene per volume of catalyst per hour.

To the benzene was added part by weight of carbon sulfide to prevent the sulfur content of the catalyst from decreasing. With this (standard) catalyst, a conversion of 28.1% of benzene into cyclohexane was obtained. To compare this hydrogenating activity with that of the catalysts described hereinafter, a value of 100 is assigned to this catalyst.

Catalyst B

Catalyst B was prepared in the same way as described for Catalyst A, the difference being that after the calcination and before sulfiding, the catalyst was treated with hydrogen chloride as a mixture of hydrogen chloride and hydrogen in a volume ratio of 1:7 at 450° C., for 16 hours and at a pressure of 10 atm. gauge. The hydrogenating activity of this catalyst amounted to 100.

Catalyst C

The preparation was similar to that of Catalyst A; however, a treatment with hydrogen chloride was given during sulfiding by passing a mixture of hydrogen sulfide, hydrogen chloride and hydrogen (volume ratio 1:1:7) over the impregnated composition for 16 hours, at a temperature of 450° C. and a pressure of 10 atm. gauge. The hydrogenating activity of this catalyst amounted to 400, i.e., under similar reaction conditions at four times higher space velocity can be applied to attain the same conversion as with Catalyst A (activity: 100).

Catalyst D

The preparation of this catalyst was carried out in the same way as that of Catalyst A; however, after sulfiding a mixture of hydrogen sulfide, hydrogen chloride and hydrogen (volume ratio 1:1:7) was passed over the sulfided catalyst for 16 hours, at a temperature of 450° C. and a pressure of 10 atm. gauge. The hydrogenating activity of this catalyst was 400.

Catalyst E

Preparation was similar to that of Catalyst A, except that the carrier was now subjected to a treatment with hydrogen chloride before impregnation with metal salt solution by passing over the alumina a mixture of hydrogen chloride and hydrogen (volume ratio 1:7) for 20 hours. This catalyst had a hydrogenating activity equal to that of Catalyst A, namely 100.

The results of the aforementioned experiments, which have been collected in Table I, clearly show that the treatment with hydrogen chloride leads to increased hydrogenating activity of the catalyst only if this treatment is applied during the sulfiding step and/or after the catalytic metals are present in sulfide form.

Table I

| Nickel-tungsten-alumina catalyst: | Activity |
|---|---|
| (a) Not treated with hydrogen chloride | 100 |
| (b) Hydrogen chloride treatment after calcination and before sulfiding | 100 |
| (c) Hydrogen chloride treatment during sulfiding | 400 |
| (d) Hydrogen chloride treatment after sulfiding | 400 |
| (e) Hydrogen chloride treatment of alumina before impregnation | 100 |

EXAMPLE II

Of the nickel-tungsten catalyst prepared according to the recipe of Example I, the influence of temperature at which the hydrochloric acid treatment takes place on the hydrogenating activity of the catalyst was examined. In this experiment, the hydrogen chloride treatment was carried out after sulfiding.

TABLE II

| Temperature of HCl treatment (° C.) | Activity of sulfided nickel-tungsten-alumina catalyst after hydrogen chloride treatment* |
|---|---|
| 450 | 400 |
| 350 | 400 |
| 200 | 300 |
| 100 | 300 |
| 25 | 300 |

*Activity of sulfided nickel-tungsten-alumina catalyst without hydrogen chloride treatment is 100.

The results of the experiments described above show that it is advantageous to carry out the hydrogen chloride treatment at relatively high temperatures and preferably above 200° C.

EXAMPLE III

In order to examine the effect of time on activity of the catalysts, two experiments were carried out under similar conditions with Catalysts A and D described in Example I.

The starting material was a kerosene having a sulfur content of 0.23% w. and an aromatics content of 19% w. This kerosene was hydrogenated at 350° C., a pressure of 100 atm. abs. and a space velocity of 2 volumes of kerosene per volume of catalyst per hour.

At the start aromatics removal of about 92.5% and 68% was obtained with Catalyst D and A, respectively. At the end of 200 hours operation, aromatics removal was about 88% and 64.5% for Catalysts D and A, respectively. Thus, the difference in hydrogenating activity between the hydrogen chloride-treated Catalyst D and the non-treated Catalyst A proves to remain substantially constant.

EXAMPLE IV

In a similar manner to that described in Example I, four catalysts were prepared which contained as metal components combinations of cobalt and molybdenum, nickel and molybdenum, cobalt and rhenium and nickel the rhenium. All catalysts contained 136 milliatoms of metal, calculated on 100 g. of alumina carrier, the atomic ratio of cobalt or nickel to molybdenum or rhenium being 0.76.

Part of the four catalysts thus prepared was subjected to a treatment with hydrogen chloride after sulfiding, in a way similar to that described in Example I for Catalyst C.

The hydrogenating activity of the various catalysts was again determined with the aid of the hydrogenation of benzene.

The results, collected in Table III, show the influence of the present hydrogen chloride treatment on activity of the sulfided catalysts.

TABLE III

| Catalysts | Not treated with hydrogen chloride | Treated with hydrogen chloride |
|---|---|---|
| Cobalt-molybdenum | 30 | 60 |
| Nickel-molybdenum | 65 | 110 |
| Cobalt-rhenium | 140 | 340 |
| Nickel-rhenium | 110 | 275 |

We claim as our invention:

1. In a process for hydrogenating unsaturated hydrocarbons at an elevated temperature and pressure with a hydrogenation catalyst comprising a metal sulfide hydrogenation component on an alumina carrier in which the catalyst composite is sulfided, the improvement which comprises contacting the catalyst with a gas providing hydrogen chloride during sulfiding.

2. The process according to claim 1 wherein contact with a gas providing hydrogen chloride is effected at a temperature of about 200° to 450° C.

3. The process according to claim 1 wherein the unsaturated hydrocarbon is an aromatic hydrocarbon.

References Cited

UNITED STATES PATENTS

| 2,799,661 | 7/1957 | De Rosset | 208—216 |
| 2,905,636 | 9/1959 | Watkins et al. | 208—216 |
| 3,094,480 | 6/1963 | Richardson | 208—216 |

DELBERT E. GANTZ, *Primary Examiner.*

HERBERT LEVINE, *Assistant Examiner.*

U.S. Cl. X.R.

252—439, 441, 442; 260—667